United States Patent
Kuwayama et al.

(10) Patent No.: US 6,386,966 B1
(45) Date of Patent: May 14, 2002

(54) BLOWER UNIT WITH NOISE-REDUCING STRUCTURE FOR VEHICLE AIR CONDITIONER

(75) Inventors: Kazutoshi Kuwayama; Manabu Miyata, both of Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/655,265

(22) Filed: Sep. 5, 2000

(30) Foreign Application Priority Data

Sep. 8, 1999 (JP) ............................................ 11-254490

(51) Int. Cl.$^7$ ................................................ B60H 1/00
(52) U.S. Cl. ...................... 454/139; 454/121; 454/906; 181/225
(58) Field of Search ................................ 454/906, 139, 454/69; 181/225, 226

(56) References Cited

U.S. PATENT DOCUMENTS

| 3,960,177 | A | * | 6/1976 | Baumann | 137/625.31 |
| 5,220,944 | A | * | 6/1993 | Burnett et al. | 137/630.14 |
| 5,679,073 | A | * | 10/1997 | Hsieh et al. | 454/69 |
| 6,142,864 | A | * | 11/2000 | Uemura et al. | 454/121 |

\* cited by examiner

Primary Examiner—Denise L. Esquivel
Assistant Examiner—Derek S. Boles
(74) Attorney, Agent, or Firm—Harness, Dickey & Pierce, PLC

(57) ABSTRACT

In a blower unit for a vehicle air conditioner, an inside/outside air switching door opens an inside air introduction port and closes an outside air introduction port when an inside air introduction mode is set. Plural ribs for irregularly reflecting an air-blowing noise generated by a blower fan are provided on an inner surface of the inside/outside air switching door, and top ends of the ribs are arranged along a main flow of inside air introduced from the inside air introduction port during the inside air introduction mode. Thus, the blower unit effectively reduces a reflected noise on the inner surface of the inside/outside air switching door, and effectively prevents a disturbance noise of the main flow of inside air.

10 Claims, 4 Drawing Sheets

BLOWER UNIT WITH NOISE-REDUCING STRUCTURE FOR VEHICLE AIR CONDITIONER

CROSS-REFERENCE TO RELATED APPLICATION

This application is related to and claims priority from Japanese Patent Application No. Hei. 11-254490 filed on Sep. 8, 1999, the contents of which are hereby incorporated by reference.

BACKGROUND OF THE INVENTION

1. Field of the Invention

The present invention relates to a blower unit for a vehicle air conditioner, which reduces an air-blowing noise transmitted into a passenger compartment through an inside air introduction port.

2. Description of Related Art

In a conventional blower unit described in U.S. Pat. No. 5,836,813, plural ribs for irregularly reflecting noise are disposed on a concave inner surface of a rotary door to reduce noise. However, because the plural ribs having the same height simply protrude from the concave inner surface of the rotary door a connection line connecting top ends of the plural ribs does not correspond to a main flow of inside air flowing from an inside air introduction port to a suction port of a fan, and the main flow of inside air is disturbed by the plural ribs. Therefore, flow disturbance noise of inside air is caused in the blower unit when an air amount blown by the fan is increased during an inside air introduction mode. SUMMARY OF THE INVENTION In view of the foregoing problems, it is an object of the present invention to provide a blower unit for a vehicle air conditioner, which effectively prevents both reflection noise on a door inner surface and flow disturbance noise of inside air.

According to the present invention, in a blower unit for a vehicle air conditioner, a rib member is disposed on an inner surface of a switching door to irregularly reflect noise generated by a fan during an inside air introduction mode where the switching door opens an inside air introduction port and closes an outside air introduction port, and the rib member is disposed so that a top end of the rib member is along a main flow of air flowing from the inside air introduction port toward a suction port of the fan during the inside air introduction mode. Therefore, air-blowing noise generated by the fan can be irregularly reflected by the rib member to be reduced. Further, because the top end of the rib member is positioned along the main flow of inside air flowing from the inside air introduction port toward the suction port of the fan, the main flow of inside air is not disturbed by the top end of the rib member, and flow disturbance noise of inside air can be restricted even when an amount of inside air introduced from the inside air introduction port into the suction port of the fan is increased.

Preferably, the rib member includes plural ribs protruding from the inner surface of the switching door toward an inner side of the inside/outside air switching box during the inside air introduction mode, and top ends of the ribs are disposed along the main flow of air flowing from the inside air introduction port during the inside air introduction mode. Therefore, the blower unit effectively prevents both the reflection noise on the inner surface of the switching door and the flow disturbance noise of inside air.

Further, in the blower unit, when a supplementary door separated from the switching door is disposed to open and close a supplementary inside air port, a top end of the supplementary inside air door is disposed along the main flow of air flowing from the inside air introduction port during the inside air introduction mode. Therefore, the top end of the supplementary inside air door does not disturb the main flow of inside air, and flow disturbance noise due to the top end of the supplementary inside air door is prevented.

Even when a rotary door is used as the switching door so that an opening area of the inside air introduction port is increased, the flow disturbance noise of inside air can be effectively restricted while the air-blowing noise generated by the fan can be reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
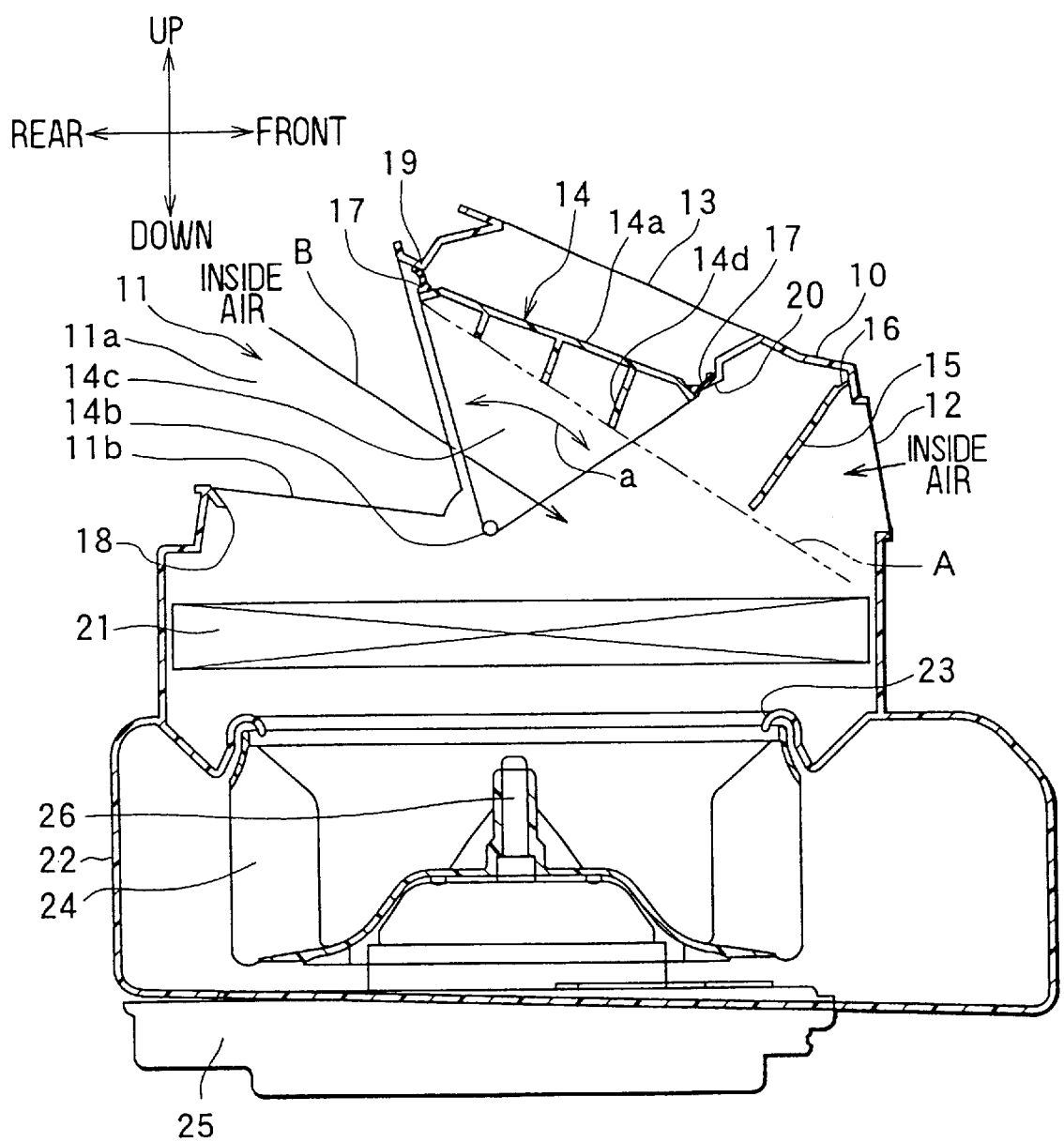
FIG. 1 is a vertical sectional view showing a blower unit of a vehicle air conditioner during an inside air introduction mode, according to a first preferred embodiment of the present invention.
Figure 2:
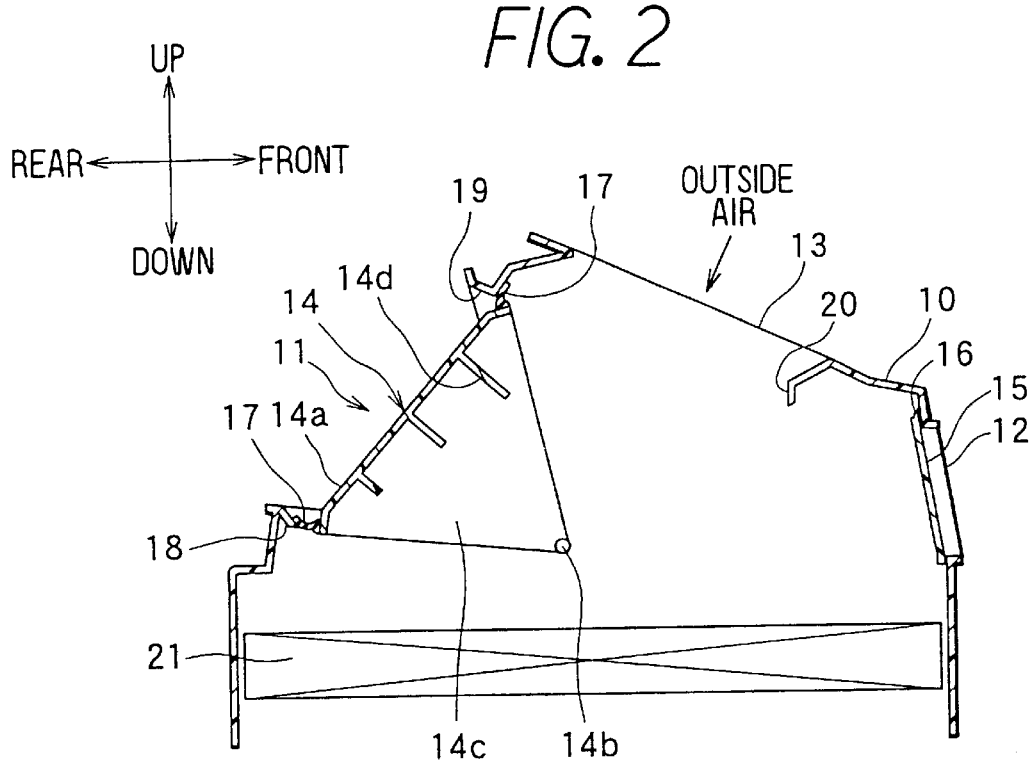
FIG. 2 is a sectional view of an inside/outside air switching box of the blower unit during an outside air introduction mode, according to the first embodiment.

A first preferred embodiment of the present invention will be described with reference to FIGS. 1 and 2. A blower unit shown in FIGS. 1, 2 is generally disposed under an instrument panel of a passenger compartment at a front-passenger's side. The blower unit is disposed in a vehicle to correspond to the arrangement direction of FIGS. 1 and 2 in an up-down direction and in a front-rear direction. The blower unit includes an inside/outside air switching box (case) 10 made of plastics, and a scroll casing 22 adjacently disposed under the inside/outside air switching box 10. The inside/outside air switching box 10 is connected to the scroll casing 22 so that an interior of the inside/outside air switching box 10 communicates with a bell-mouth like suction port 23 of the scroll casing 22.

The inside/outside air switching box 10C includes first and second inside air introduction ports 11 and 12 for introducing inside air (i.e., air inside the passenger compartment), and an outside air introduction port 13 for introducing outside air (i.e., air outside the passenger compartment). In the vehicle front-rear direction, the first inside air introduction port 11 is provided at a most rear side, the second inside air introduction port 12 is provided at a most front side and the outside air introduction port 13 is provided between the first and second inside air ports 11, 12. The second inside air introduction port 12 has an opening area smaller than that of the first inside air introduction port 11, and is used as a supplementary inside air port for sucking inside air. Lattice members (not shown) for preventing a foreign substance of the passenger compartment from being introduced into the first and second inside air introduction ports 11, 12 are disposed in the first and second inside air introduction ports 11, 12, respectively.

An inside/outside air switching door 14 and a supplementary inside air door 15 are rotatably separately accommodated within the inside/outside air switching box 10. The inside/outside air switching door 14 is a rotary door for selectively opening and closing the first inside air introduction port 11 and the outside air introduction port 13. On the other hand, the supplementary inside air door 15 is a plate like door for opening and closing the second inside air introduction port 12. The supplementary inside air door 15 is rotatably disposed within the inside/outside air switching box by a resinous hinge portion 16 having a flexibility.

Next, the structure of the inside/outside air switching door 14 is described in detail. The inside/outside air switching door 14 includes an outer peripheral wall part 14a extending in a door rotation direction (circumpherential direction) "a", a rotation shaft 14b, and both fan-like side plates 14c through which the rotation shaft 14b is coupled with both side ends of the outer peripheral wall part 14a in an axial direction of the rotation shaft 14b. A dimension of a door base portion constructed by the outer peripheral wall part 14a and the fan-like side plates 14c is set to have a necessary size for sufficiently closing the first inside air introduction port 11 and the outside air introduction port 13.

In the first embodiment, the first inside air introduction port 11 is provided to be opened and closed by not only the outer peripheral wall part 14a but also the fan-like side plates 14c. That is, the first inside air introduction port 11 has an opening portion 11a placed at a vehicle rear side surface of the inside/outside air switching box 10, and V-like openings 11b placed at both side surfaces of the inside/outside air switching box 10 in a vehicle right-left direction (i.e., paper vertical direction in FIGS. 1 and 2). Therefore, the first inside air introduction port 11 has an opening shape opened from a position opposing the outer peripheral wall part 14a of the rotary door 14 to positions opposing the side plates 14c during the inside air introduction mode. Accordingly, an opening area of the first inside air introduction port 11 is increased, and maximum cooling capacity during an inside air introduction mode is improved. On the other hand, the outside air introduction port 13 and the second inside air introduction port 12 generally have rectangular flat shapes, respectively.

The inside/outside air switching door 14 is constructed to open and close the opening 11a on the door peripheral side and the openings 11b on the door axial sides. In the present invention, this type door such as the inside/outside air switching door 14 is referred to as a rotary door.

The rotation shaft 14b protrudes from rotation center positions of the side plates 14c to axial outer sides so that both ends of the rotation shaft 14b are rotatably held in bearing holes (not shown) of the inside/outside air switching box 10. One side end of the rotation shaft 14b of the inside/outside air switching door 14 and an operation part (not shown) of the supplementary inside air door 15 are connected to a door operation mechanism (not shown) in an outer side of the inside/outside air switching box 10.

Therefore, the inside/outside air switching door 14 and the supplementary inside air door 15 are operatively linked to each other.

An inner space of the inside/outside air switching door 14, defined by the outer peripheral wall part 14a and the fan-like side plates 14c, is directly opened to an outside. Therefore, air can freely pass through the inside/outside air switching door 14 in the vehicle front-rear direction (i.e., right-left direction in FIG. 1). The inside/outside air switching door 14 further includes ribs 14d described later, and is integrally molded by resin such as polypropylene.

Next, a door seal structure in the inside/outside air switching door 14 will be now described. Lip-like elastic seal members 17 are provided in peripheral surfaces of the outer peripheral wall part 14a and the side plates 14c. In FIGS. 1 and 2, only the elastic seal member 17 on the outer peripheral wall part 14a is indicated, but the elastic seal member 17 on the side plates 14c is not indicated.

The elastic seal member 17 is made of an elastomer rubber (e.g., polypropylene group elastomer rubber). By selecting an elastomer rubber to the same group as the door base portion of the inside/outside air switching door 14, the elastic seal member 17 can be integrally simultaneously molded with the door base portion of the inside/outside air switching door 14.

Protrusion portions 18–20 (bank-like portions) having tilt seal surfaces are provided in the inside/outside air switching box 10 at peripheral positions of the first inside air introduction port 11 and the outside air introduction port 13. When the inside/outside air switching door 14 opens or closes the first inside air introduction port 11 and the outside air introduction port 13, the elastic seal members 17 of the inside/outside air switching door 14 press the tilt seal surfaces of the protrusion portions 18, 19, 20. Here, the protrusion portion can be integrally formed with the inside/outside air switching box 10.

Next, the ribs 14d of the inside/outside air switching door 14 will be described in detail. The plural ribs 14d (e.g., three ribs in the first embodiment) are disposed to protrude from an inner side surface of the outer peripheral wall part 14a toward the rotation shaft 14b so that noise is irregularly reflected and is reduced in the inside/outside air switching door 14. The plural ribs 14d are flat-like protrusion plates disposed at predetermined distance positions on the inner side surface of the outer peripheral wall part 14a to protrude in a direction crossing with the door axial direction. The ribs 14d continuously extend in the door axial direction of the inside/outside air switching door 14 to couple both the right and left side plates 14c. Therefore, the ribs 14d are integrally formed with the outer peripheral wall part 14a and the side plates 14c.

During an inside air introduction mode shown in FIG. 1, inside air flows from the first inside air introduction port 11 into an inlet surface of an air filter 21 along a main flow shown by arrow B in FIG. 1. During the inside air introduction mode, a connection line A shown by the chain line connects an end part of the inner side surface of the outer peripheral wall part 14a on a side of the first inside air introduction port 11, and an end part (i.e., front side end part) of the inlet surface of the air filter 21, opposite to the first inside air introduction port 11. In the first embodiment, the connection line A is set along the main flow B of the inside air from the first inside air introduction port 11 to be approximately parallel to the main flow B.

Further, heights of the plural ribs 14d are set so that top ends of the ribs 14d are positioned approximately on the connection line A. Further, the height dimension of the supplementary inside air door 15 is set so that a top end of the supplementary inside air door 15 during the inside air introduction mode is positioned approximately on the connection line A. Accordingly, during the inside air introduction mode, the top ends of the plural ribs 14d and the supplementary inside air door 15 are arranged along the main flow B of inside air flowing from the first inside air introduction port 11. In the air filter 21 of FIG. 1, a filter member formed by a corrugated paper or a porous polyurethane foam is supported by a resinous frame. The air filter 21 is for removing dust contained in air, and has a flat plate shape. However, in the air filter 21, an adsorbent such as activated carbon for removing smell composition may be added in the filter member, so that a deodorizing function can be obtained.

The scroll casing 22 is made of resin, and has a bell-mouth suction port 23 at a position immediately downstream from the air filter 21. A blower fan 24 is disposed at a center position of a scroll-shaped inner space of the scroll casing 22, so that air sucked from the suction port 23 is blown toward a radial outside of the blower fan 24 by rotation of the blower fan 24. The blower fan 24 is connected to a rotation shaft 26 of a driving motor 25 to be rotated with the rotation of the rotation shaft 26.

An air outlet (not shown) of the scroll casing 22 is connected to an air conditioning unit (not shown) of the vehicle air conditioner. The air conditioning unit is for adjusting air state to be blown into the passenger compartment. The air state is adjusted in the air conditioning unit by cooling, defrosting, heating and the like.

Next, operation of the blower unit for the vehicle air conditioner according to the first embodiment will be now described. A switching operation of the inside/outside air introduction is performed by the inside/outside air switching door 14 and the supplementary inside air door 15. During the inside air introduction mode shown in FIG. 1, the top ends of the elastic seal members 17 of the inside/outside air switching door 14 are elastically pressed to the tilt seal surfaces of the protrusion portions 19, 20, so that the outside air introduction port 13 is fully closed and the first inside air introduction port 11 is fully opened. At this time, the supplementary inside air door 15 is positioned at the solid line position in FIG. 1 to fully open the second inside air introduction port 12. Thus, during the inside air introduction mode, inside air is introduced from both the first inside air introduction port 11 and the second inside air introduction port 12 by the operation of the blower fan 24, and is blown toward the air conditioning unit of the vehicle air conditioner.

When the outside air introduction mode is set, the inside/outside air switching door 14 is rotated by a predetermined angle in a counterclockwise direction from the solid line position in FIG. 1 to the position in FIG. 2. Therefore, during the outside air introduction mode, the top ends of the elastic seal members 17 of the inside/outside air switching door 14 are elastically pressed to the tilt seal surfaces of the protrusion portions 18, 19, so that the outside air introduction port 13 is fully opened and the first inside air introduction port 11 is fully closed. At the same time, the top ends of the elastic seal members (not shown) of the side plates 14c are elastically pressed to the tilt seal surfaces of protrusions of the inside/outside air switching box 10. As a result, during the outside air introduction mode, both the openings 11a and 11b of the first inside air introduction port 11 are closed by the outer peripheral wall part 14a and the side plates 14c of the inside/outside air switching door 14, and the outside air introduction port 13 is fully opened. Further, the supplementary inside air door 15 is positioned at the solid line position in FIG. 2 to fully close the second inside air introduction port 12. Thus, during the outside air introduction mode, only outside air is blown from the outside air introduction port 13 by the operation of the blower fan 24, and is blown toward the air conditioning unit of the vehicle air conditioner.

Provided that the ribs 14d are not formed on the inner surface of the outer peripheral wall part 14a of the inside/outside air switching door 14, noise generated in the suction port 23 of the blower fan 22 during the inside air introduction mode is reflected on the inner surface of the outer peripheral wall part 14a, and is directly transmitted into the passenger compartment through the inside air introduction port 11. However, according to the first embodiment, plural plate-like ribs 14d protruding from the inner surface of the outer peripheral wall part 14a toward the rotation shaft 14b are formed. Therefore, during the inside air introduction mode, noise is irregularly reflected within spaces defined between the outer peripheral wall part 14a and the plural ribs 14d, and within spaces defined between the ribs 14d, an inner surface of the inside/outside air switching box 10 and the supplementary inside air door 15. Accordingly, air-blowing noise generated in the suction port 23 of the blower fan 24 is irregularly reflected in these spaces, and the noise energy is reduced.

Further, the top ends of the ribs 14d and the supplementary inside air door 15 are arranged along the main flow B of the inside air from the first inside air introduction port 11 to be approximately parallel to the main flow B. Therefore, the main flow B of inside air is not disturbed by the top ends of the plural ribs 14d and the supplementary inside air door 15. Accordingly, it can prevent flow disturbance noise due to a disturbance of the main flow B of inside air from being generated.

Further, because heights of the plural ribs 14d and the supplementary inside air door 15 are different from each other, volumes of the spaces defined by the outer peripheral wall part 14a and the plural ribs 14d, and the volumes of the spaces defined by the ribs 14d, an inner surface of the inside/outside air switching box 10 and the supplementary inside air door 15 are different from each other. Therefore, air-blowing noise can be effectively reduced in a wide-range frequency .

As a result, in the first embodiment, a noise level transmitted from the inside air introduction port 12 into the passenger compartment during the inside air introduction mode can be effectively reduced. During the inside air introduction mode, when a face mode is set as an air outlet mode for the passenger compartment, when an air mixing door of the air conditioning unit is set at a maximum cooling position, and when an air volume of the blower fan 24 is set at 550 m$^3$/h, noise can be reduced by 0.5 dB as compared with a case where the plural ribs 14d are not provided.

Figure 3:
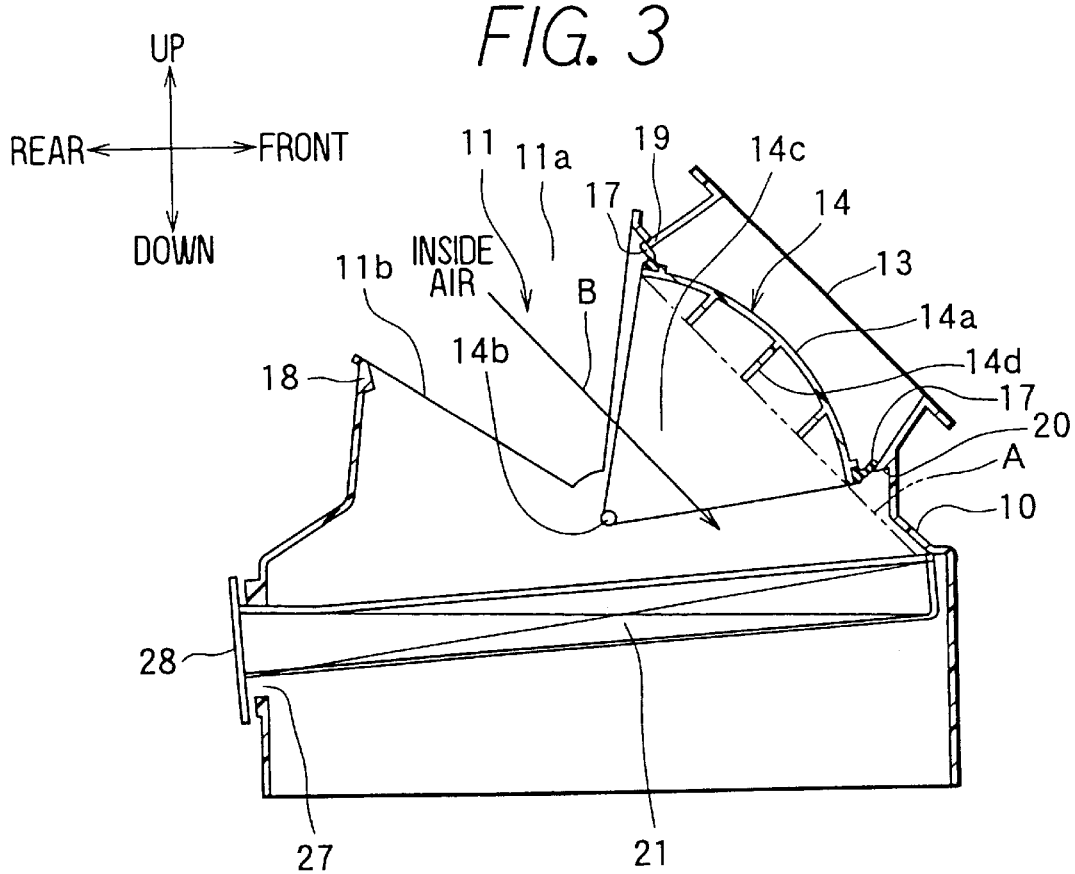
FIG. 3 is a sectional view of an inside/outside air switching box of a blower unit during an inside air introduction mode, according to a second preferred embodiment of the present invention.

A second preferred embodiment of the present invention will be now described with reference to FIG. 3. In the second embodiment, the second inside air Introduction port 12 and the supplementary inside air door 15 described in the first embodiment are omitted. Further, in the above-described first embodiment, the outer peripheral wall part 14a is formed into a flat shape. However, in the second embodiment, the outer peripheral wall part 14a is formed into a circular arc shape having a curvature radius with a rotation center of the rotation shaft 14b.

In the second embodiment, the positions of top ends of the plural ribs 14d are set to be arranged along the main flow B of inside air sucked from the inside air introduction port 11. Therefore, in the second embodiment, the effect similar to that of the first embodiment can be obtained. Further, because the second inside air introduction port 12 is not provided, noise transmitted from the second inside air Introduction port 12 into the passenger compartment is not caused.

Further, in the second embodiment, the air filter 21 is detachably inserted into the inside/outside air switching box 10 from an opening 27 provided in the inside/outside air switching box 10, and the opening 27 is closed by a cover member 28 provided in the frame member of the air filter 21 after the air filter 21 is inserted. In the second embodiment, the other parts are similar to those of the above-described first embodiment.

Figure 4:
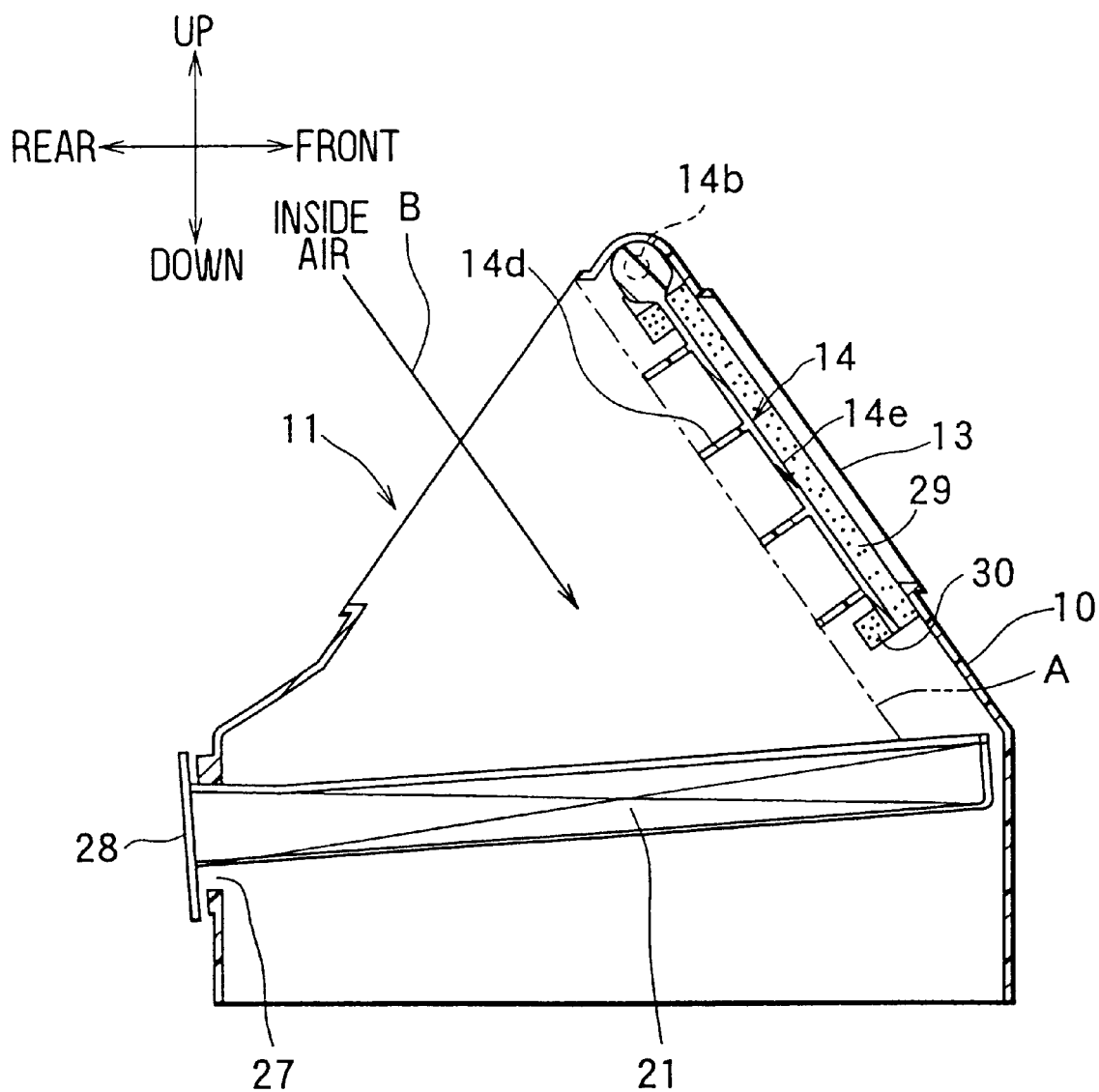
FIG. 4 is a sectional view of an inside/outside air switching box of a blower unit during an inside air introduction mode, according to a third preferred embodiment of the present invention.

A third preferred embodiment of the present invention will be now described with reference to FIG. 4. In the above-described first and second embodiments, the inside/outside air switching door 14 is constructed by a rotary door. However, in the third embodiment, the inside/outside air switching door 14 is constructed by a plate-like door. Further, in the third embodiment, the second inside air introduction port 12 and the supplementary inside air door 15 described in the first embodiment are omitted.

In the third embodiment, a plate-like elastic seal member 29 made of a packing material such as a porous foaming material is bonded to an entire one-side surface of the inside/outside air switching door 14, at a side of the outside air introduction port 13. On the other hand, a rectangular elastic seal member 30 made of a packing material such as a porous foaming material is bonded to the other surface of the inside/outside air switching door 14 on a side of the inside air introduction port 11 only at a position corresponding to an opening peripheral part of the inside air introduction port 11. In the third embodiment, the inside air introduction port 11 is a flat opening.

Further, plural ribs 14d are integrally formed with a base plate 14e of the inside/outside air switching door 14 at positions inside the elastic seal member 30. Even in this case, the positions of top ends of the plural ribs 14d are set to be arranged along the main flow B of inside air sucked from the inside air introduction port 11. Therefore, in the third embodiment, the effect similar to that of the first embodiment can be obtained. Further, because the second inside air introduction port 12 is not provided, noise transmitted from the second inside air introduction port 12 into the passenger compartment is not caused.

In the third embodiment, during an outside air introduction mode, the top ends of the ribs 14d protrude to an outer side of the inside/outside air switching box 10 through the inside air introduction port 11. Therefore, when a lattice member (not shown) for preventing a foreign substance of the passenger compartment from being introduced into the inside air introduction port 11 is provided in the inside air introduction port 11, the lattice member must not interfere with the ribs 14d. In the third embodiment, each of the elastic members 29, 30 may be formed into a thin lip-like seal member.

Figure 5:
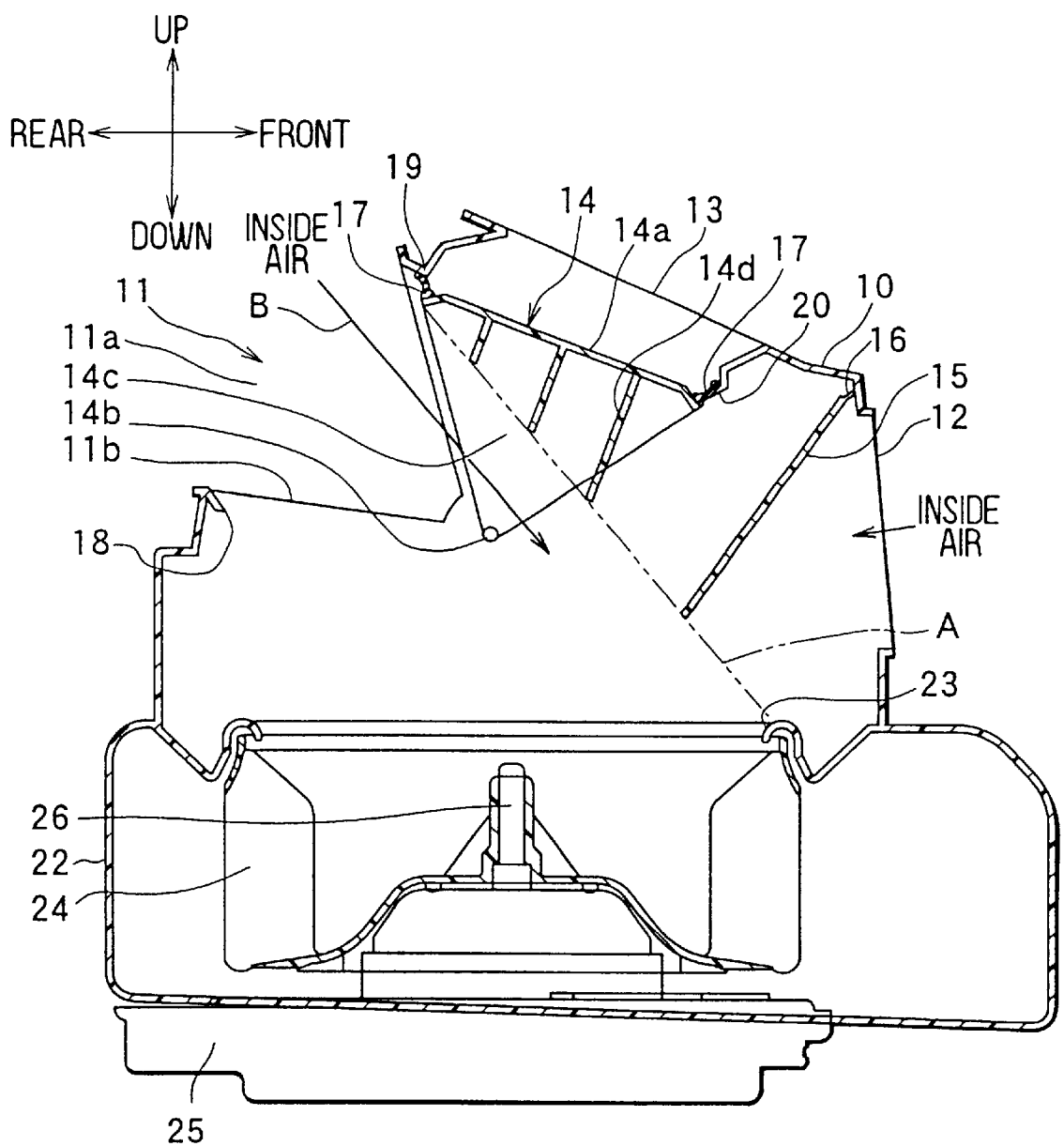
FIG. 5 is a sectional view of an inside/outside air switching box of a blower unit during an inside air introduction mode, according to a fourth preferred embodiment of the present invention.

A fourth preferred embodiment of the present invention will be now described with reference to FIG. 5. In the above-described embodiments, the air filter 21 is disposed at an upstream air side of the suction port 23 of the scroll casing 22. However, in the fourth embodiment, the air filter 21 is omitted. Thus, in the fourth embodiment, during the inside air introduction mode, a connection line A shown by the chain line in FIG. 5 connects an end part of the inner side surface of the outer peripheral wall part 14a on a side of the first inside air introduction port 11, and an end part (i.e., front side end part) of the suction port 23 of the scroll casing 22, opposite to the first inside air introduction port 11. In the first embodiment, the connection line A is set along the main flow B of the inside air from the first inside air introduction port 11 to be approximately parallel to the main flow B. Further, heights of the plural ribs 14d are set so that top ends of the ribs 14d are positioned approximately on the connection line A. Further, the height dimension of the supplementary inside air door 15 is set so that the top end of the supplementary inside air door 15 during the inside air introduction mode is positioned approximately on the connection line A. Accordingly, during the inside air introduction mode, the top ends of the plural ribs 14d and the supplementary inside air door 15 are arranged along the main flow B of inside air from the first inside air introduction port 11, similarly to the above-described first embodiment. The other parts of the fourth embodiment are similar to those of the above-described first embodiment. Therefore, in the fourth embodiment, effect similar to that of the first embodiment can be obtained.

Although the present invention has been fully described in connection with the preferred embodiments thereof with reference to the accompanying drawings, it is to be noted that various changes and modifications will become apparent to those skilled in the art.

For example, the outer peripheral part 14a of the inside/outside air switching door 14 is formed into a flat shape in the above-described first embodiment, and is formed into a circular arc shape in the above-described second embodiment. However, the outer peripheral part 14a of the inside/cutside air switching door 14 may be formed into any other shape such as a spherical surface.

Further, in the above-described first and fourth embodiments, a flat plate-like rib for irregularly reflecting air-blowing noise may be also provided on the plate-like supplementary inside air door 15.

Such changes and modifications are to be understood as being within the scope of the present invention as defined by the appended claims.

What is claimed is:

1. A blower unit for a vehicle air conditioner, comprising:
    an inside/outside air switching box having an inside air introduction port through which air inside a passenger compartment is introduced, and an outside air introduction port through which air outside the passenger compartment is introduced;
    a switching door disposed in said inside/outside air switching box, for selectively opening and closing said inside air introduction port and said outside air introduction port;
    a fan disposed at a downstream air side of said inside/outside air switching box for blowing air introduced from said inside air introduction port and said outside air introduction port into the passenger compartment; and
    a rib member provided on an inner surface of said switching door, which irregularly reflects noise generated by said fan during an inside air introduction mode where said switching door opens said inside air introduction port and closes said outside air introduction port; wherein:
    said rib member includes plural ribs protruding from said inner surface of said switching door toward an inner side of said inside/outside air switching box during said inside air introduction mode;

top ends of said ribs are disposed along the main flow of air from said inside air introduction port during said inside air introduction mode; and a connection line connecting said top ends of said ribs is approximately parallel to the main flow of air flowing from said inside air introduction port during said inside air introduction mode.

2. A blower unit for a vehicle air conditioner, comprising:

an inside/outside air switching box having an inside air introduction port through which air inside a passenger compartment is introduced, and an outside air introduction port through which air outside the passenger compartment is introduced;

a switching door disposed in said inside/outside air switching box, for selectively opening and closing said inside air introduction port and said outside air introduction port;

a fan disposed at a downstream air side of said inside/outside air switching box, for blowing air introduced from said inside air introduction port and said outside air introduction port into the passenger compartment; and a rib member provided on an inner surface of said switching door, which irregularly reflects noise generated by said fan during an inside air introduction mode where said switching door opens said inside air introduction port and closes said outside air introduction port; wherein:

said rib member has a top end which is disposed along a main flow of air flowing from said inside air introduction port during said inside air introduction mode;

said inside/outside air switching box further has a supplementary inside air port for introducing air inside the passenger compartment, said supplementary inside air port having an opening area smaller than that of said inside air introduction port, the blower unit further comprising:

a supplementary door separated from said switching door, which is disposed to open and close said supplementary inside air port, wherein said supplementary door has a top end which is disposed along the main flow of air flowing from said inside air introduction port during said inside air introduction mode.

3. The blower unit according to claim 1, wherein:

said inside air introduction port has a first opening provided at a position corresponding to an outer peripheral side of said switching door, and a second opening provided at a position corresponding to both sides of said switching door in an axial direction of a rotation shaft of said switching door; and said switching door is a rotary door disposed to open and close both said first opening and said second opening of said inside air introduction port.

4. A blower unit for a vehicle air conditioner, comprising:

an inside/outside air switching box having an inside air introduction port through which air inside a passenger compartment is introduced, and an outside air introduction port through which air outside the passenger compartment is introduced;

a switching door disposed in said inside/outside air switching box, for selectively opening and closing said inside air introduction port and said outside air introduction port;

a fan disposed at a downstream air side of said inside/outside air switching box, for blowing air introduced from said inside air introduction port and said outside air introduction port into the passenger compartment; and a rib member provided on an inner surface of said switching door, which irregularly reflects noise generated by said fan during an inside air introduction mode where said switching door opens said inside air introduction port and closes said outside air introduction port; wherein:

said rib member has a top end which is disposed along a main flow of air flowing from said inside air introduction port during said inside air introduction mode:

said inside air introduction port has a first opening provided at a position corresponding to an outer peripheral side of said switching door, and a second opening provided at a position corresponding to both sides of said switching door in an axial direction of a rotation shaft of said switching door;

said switching door is a rotary door disposed to open and close both said first opening and said second opening of said inside air introduction port;

said switching door includes an outer peripheral wall part for opening and closing said first opening of said inside air introduction port, and side plates for opening and closing said second openings; and said rib member includes plural ribs which are disposed on an inner surface of said outer peripheral wall part so that each top end of said ribs is along the main flow of inside air flowing from said inside air introduction port during said inside air introduction mode.

5. The blower unit according to claim 4, wherein:

said ribs have protrusion heights protruding from said inner surface of said outer peripheral wall part; and said protrusion heights of said ribs are different from each other.

6. The blower unit according to claim 4, wherein said side plates are disposed to be connected to said outer peripheral wall part and said rotation shaft.

7. The blower unit according to claim 6, wherein each of said ribs is a flat plate extending in said axial direction of said rotation shaft to be connected to said side plates.

8. The blower unit according to claim 7, wherein said inner surface of said outer peripheral wall part has a flat shape.

9. The blower unit according to claim 7, wherein said outer peripheral wall part has a circular arc shape curved around said rotation shaft to have a predetermined curvature radius.

10. The blower unit according to claim 1, further comprising an air filter for filtering air to be introduced into an air suction port of said fan, wherein said air filter is disposed at an upstream air side of said air suction port of said fan.

* * * * *